(12) United States Patent
Talmola et al.

(10) Patent No.: US 6,822,696 B2
(45) Date of Patent: Nov. 23, 2004

(54) RECEIVER

(75) Inventors: Pekka Talmola, Turku (FI); Mauri Makivuoti, Turku (FI)

(73) Assignee: Nokia Oy, Espoo (FI)

( * ) Notice: Subject to any disclaimer, the term of this patent is extended or adjusted under 35 U.S.C. 154(b) by 411 days.

(21) Appl. No.: 09/893,979

(22) Filed: Jun. 29, 2001

(65) Prior Publication Data

US 2002/0008788 A1 Jan. 24, 2002

(30) Foreign Application Priority Data

Jun. 30, 2000 (GB) .............................. 00116249

(51) Int. Cl.$^7$ ............................ H04N 5/455; H04B 7/00
(52) U.S. Cl. ................. 348/726; 455/239.1; 455/240.1; 455/245.1; 375/345
(58) Field of Search ................................ 348/726, 725, 348/678, 735; 455/240.1, 239.1, 234.1, 245.1, 249.1, 250.1; 375/345, 346, 347, 349; H04N 5/44, 5/455

(56) References Cited

U.S. PATENT DOCUMENTS 6,498,926 B1 * 12/2002 Ciccarelli et al. ........ 455/240.1

FOREIGN PATENT DOCUMENTS

| EP | 0366485 | 5/1990 | ........... H04B/7/005 |
|---|---|---|---|
| EP | 0814567 A2 | 12/1997 | |
| EP | 0814567 | 12/1997 | ............ H04B/1/10 |
| EP | 0999649 | 5/2000 | ............ H04B/1/10 |
| WO | 99/045653 | 5/1990 | |
| WO | 94/06213 | 3/1994 | |
| WO | 9406213 | 3/1994 | ............ H04B/1/10 |
| WO | 9945653 | 9/1999 | ............ H04B/1/10 |

* cited by examiner

*Primary Examiner*—Michael H. Lee
(74) *Attorney, Agent, or Firm*—Antonelli, Terry, Stout & Kraus, LLP

(57) ABSTRACT

The present invention relates to receivers such as multi-carrier receivers. An orthogonal frequency division multiplex (OFDM) receiver in a terrestrial digital video broadcast (DVB-T) network is required to operate in a complex channel environment, wherein high power analogue television signals may co-exist. The mix of high power analogue television signals and lower power digital signals results primarily from the concurrent existence of both analogue and digital television services. The present invention provides a receiver having improved power efficiency.

14 Claims, 5 Drawing Sheets

RECEIVER

BACKGROUND OF THE INVENTION

The present invention relates to receivers such as multi-carrier receivers.

An orthogonal frequency division multiplex (OFDM) receiver in a terrestrial digital video broadcast (DVB-T) network is required to operate in a complex channel environment, wherein high power analogue television signals may co-exist. The mix of high power analogue television signals and lower power digital signals results primarily from the concurrent existence of both analogue and digital television services.

FIG. 1 shows an example of a typical section of the UHF spectrum, showing a number of adjacent channels N−1, N and N+1, with each channel occupying 8 MHz bandwidth. The existing analogue channels are distributed in the UHF spectrum according to known frequency planning criteria. Due to the nature of analogue receiver technology, especially when analogue television was first introduced, and the difficulty of achieving adequate channel interference rejection, each analogue channel is separated from the others by a minimum gap of 8 MHz. It is in these gaps that digital channels are broadcast.

FIG. 2 is a block diagram showing a digital video broadcasting (DVB-T) set-top-box receiver 200 according to the prior art. A DVB-T signal is received by an antenna 202. The received signal is amplified by a radio frequency (RF) amplifier 204. The amplified signal is subsequently mixed in a mixer 206 with a signal generated by a local oscillator 214. The mixer 206 reduces the frequency of the received RF signal to that of an intermediate frequency (IF) signal. The IF signal is amplified by an IF amplifier 208, before passing to a demodulator 209 and a forward error corrector (FEC) 210, where demodulation of the signal and error correction takes place. The output 212 from the FEC 210 is a DVB-T transport stream.

Normal network planning assumes that the adjacent analogue channels can be up to 35 dB higher than a digital channel. In order to cope with such high power adjacent channels, and to be able to successfully receive a desired digital channel, the radio frequency (RF) stages of a digital receiver must be highly linear. If a digital receiver is not highly linear, intermediate modulation (IM) products may interfere with the desired signal and prevent good reception. However, current RF amplifiers are not completely linear devices, and exhibit non-linear properties. High linearity can be achieved, however, by having high bias currents in the RF amplifiers of a digital receiver.

BRIEF SUMMARY OF THE INVENTION

According to a first aspect of the present invention, there is provided a receiver for receiving signals conveying information, wherein the receiver includes a non-linear element, the receiver comprising: a demodulator for demodulating the received signal to produce demodulated information; means for determining the quality of the demodulated information; and means for adjusting the linearity of the non-linear element in dependence on the determined quality.

This advantageously allows the power consumption of receivers to be reduced in certain conditions. As people become more environmentally aware, efficient and economic consumer goods becomes increasingly important. Such reductions in power consumption can contribute significantly to power savings for the consumer. The present invention provides further advantages in the field of mobile and portable receivers, wherein reductions in power relates directly to increased operating time from a given battery or portable power unit or can even result in a reduction in size of a battery unit.

BRIEF DESCRIPTION OF THE DRAWINGS

The invention will now be described, by way of example only, with reference to the accompanying diagrams in which.

DETAILED DESCRIPTION OF THE PREFERRED EMBODIMENTS OF THE INVENTION

Figure 1:
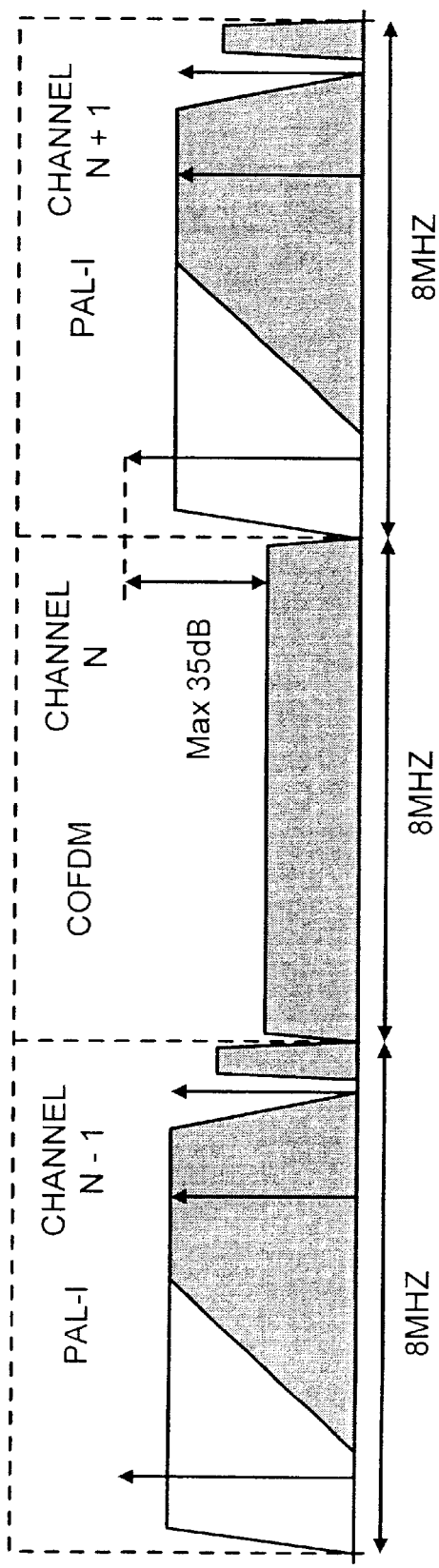
FIG. 1 is a diagram showing a typical portion of the UHF spectrum.

As described above, FIG. 1 is a diagram showing a typical portion of the UHF spectrum, showing a digital COFDM channel sandwiched between adjacent analogue television channels. Depending on the exact location within the UHF spectrum, the digital channel may be bound on one or both sides by an adjacent analogue television signal. It may also be possible for a digital channel to exist without any immediate neighbours. This will, however, depend on the precise location within a frequency band. The worse case scenario is where the digital channel is bounded by an adjacent analogue television channel on both sides.

Figure 4:
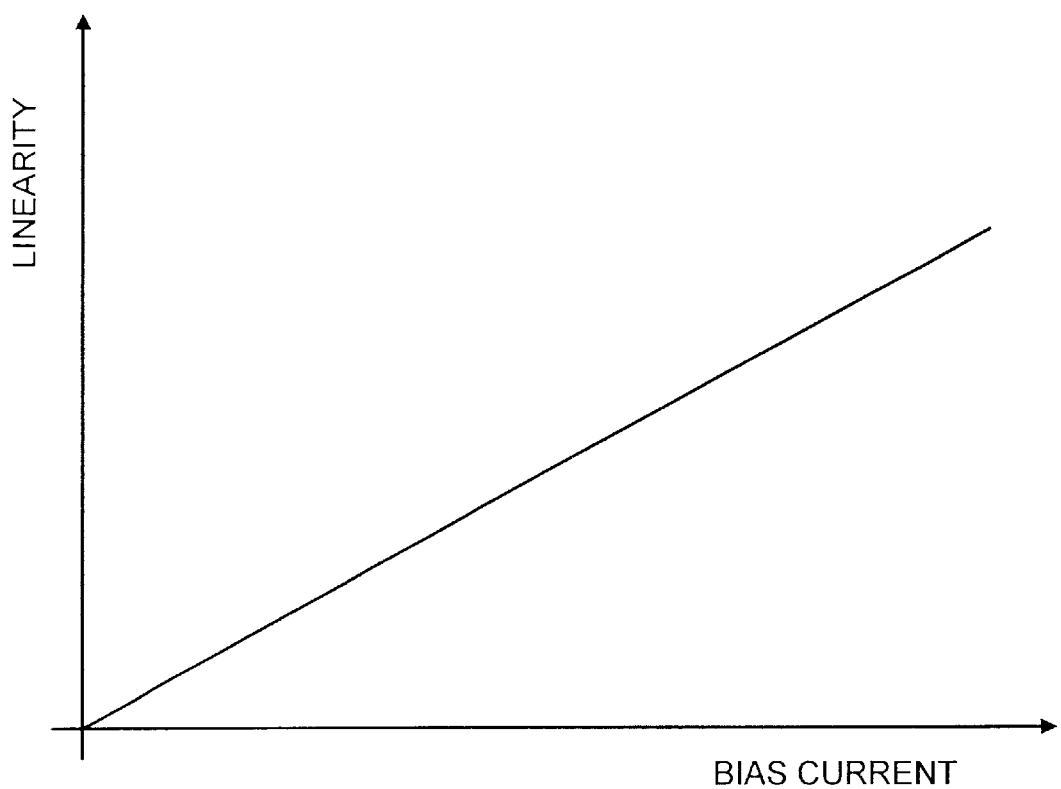
FIG. 4 is a graph showing the relationship between bias current and linearity.

The linearity of an RF amplifier is governed by the amount of bias current applied thereto. FIG. 4 is a graph showing the relationship between bias current and linearity. It is clear that increased bias current results in increased linearity.

Figure 2:
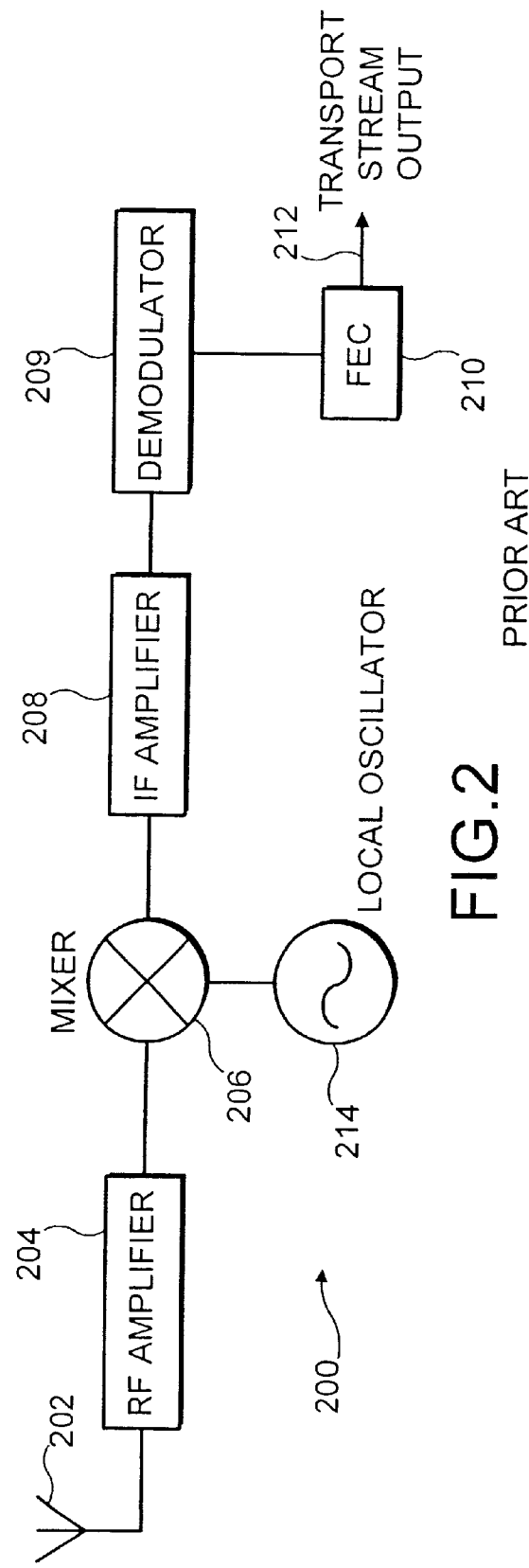
FIG. 2 is a block diagram showing a digital video broadcasting (DVB-T) receiver according to the prior art.
Figure 3:
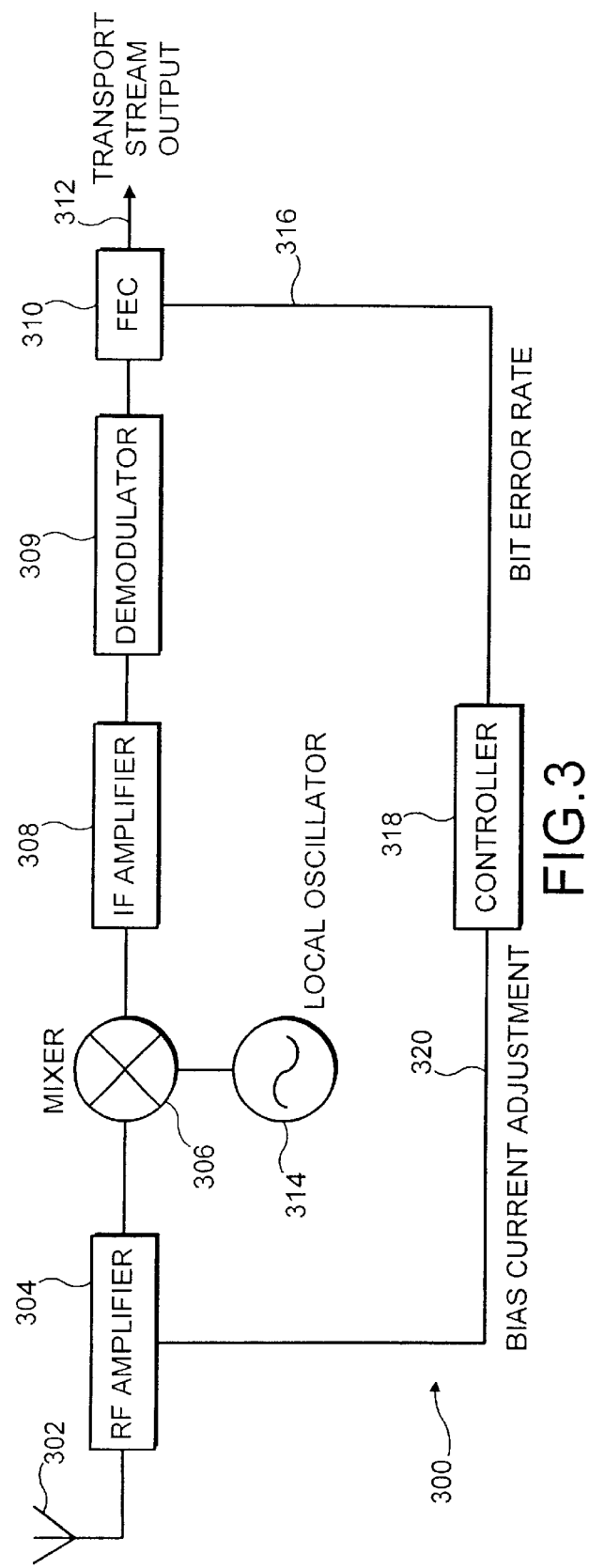
FIG. 3 is a block diagram showing a digital video broadcasting (DVB-T) receiver according to an embodiment of the present invention.

FIG. 3 is a block diagram showing a terrestrial digital video broadcasting (DVB-T) receiver according to an embodiment of the present invention. The receiver may be a fixed consumer set-top-box type receiver, or alternatively may be a portable or mobile receiver. The receiver functions largely as described above with reference to FIG. 2, with the addition of a feedback loop and a controller 318. Although the detail of RF amplifier 204 of FIG. 2 and 304 of FIG. 3 has not been shown, it will be apparent to those skilled in the art that a wide variety of standard RF amplifying techniques could be used, including field effect transistors (FET), and power integrated circuits (ICs).

The controller 318 acquires the bit error rate (BER) which is generated by the FEC 310. The BER is available on most commercially available FECs and may be supplied directly as an output signal, or it may be readable from an internal or an external memory. The BER gives an indication of the number of errors on the decoded signal. Typically, BER is only used during installation of a receiver where it greatly assists correct alignment of the antenna. For example, if the antenna is not correctly aligned, noise on the received signal will cause errors to be created in the decoded signal. By displaying BER, for example as a bar graph on an installation screen, a user may orient the antenna to achieve the lowest BER.

Figure 5:
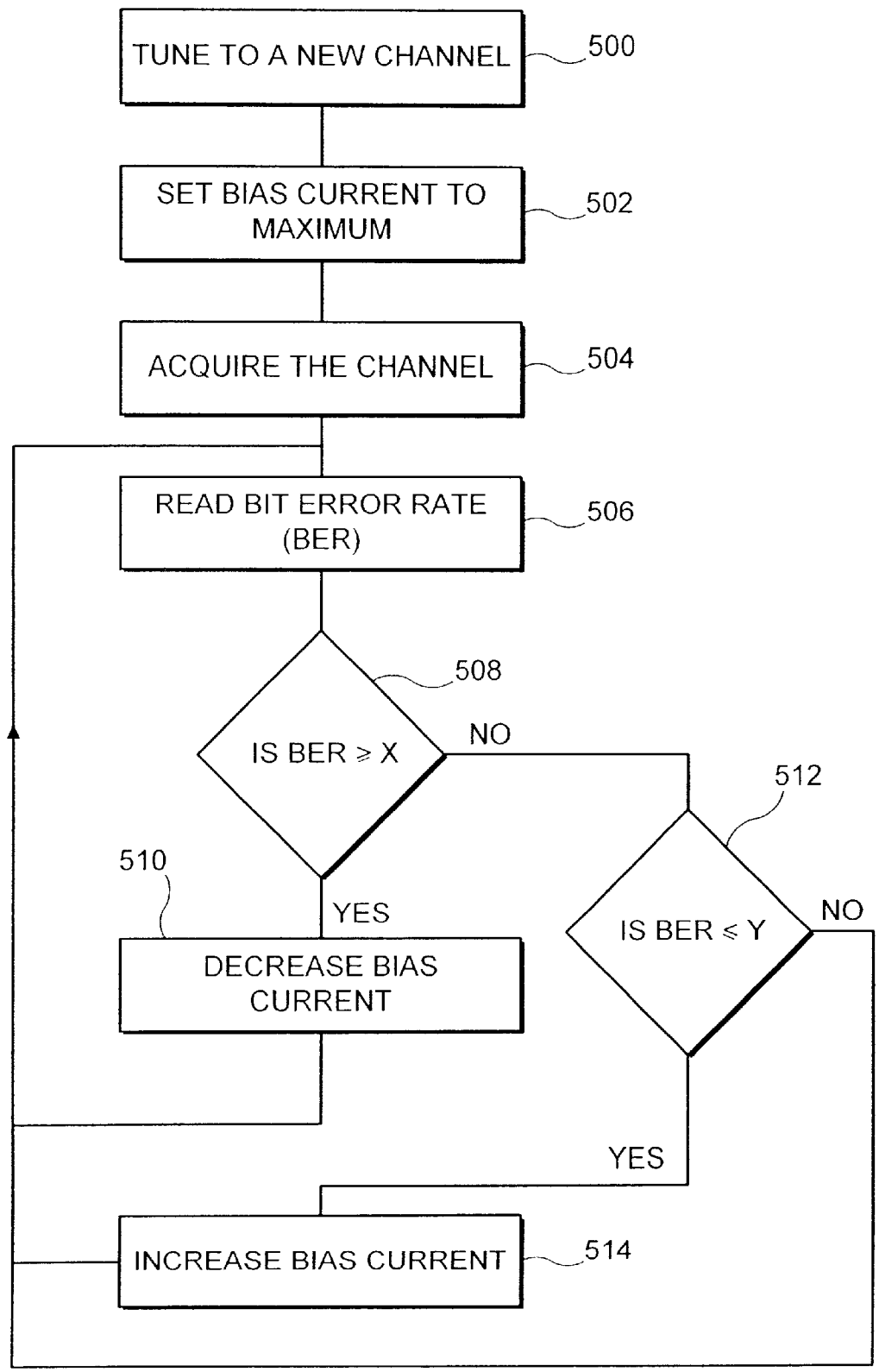
FIG. 5 is a flow diagram showing an example of the functional steps made by the controller of FIG. 3.

The controller 318 adjusts the bias current of the RF amplifier in accordance with the BER. FIG. 5 is a flow diagram showing an example of the functional steps made by the controller of FIG. 3.

When the receiver is tuned to a new channel (step 500), the controller 318 sets the bias current of the RF amplifier 304 to the highest level to ensure the highest linearity (step 502). Once the receiver has locked to the channel and has started decoding the received signal (step 504), the controller 318 acquires the BER from the FEC 310 (step 506). The controller 318 monitors the BER to determine whether the BER is better than a predetermined acceptable level (step 508). If the BER is better than the predetermined acceptable level, the controller 318 reduces the bias current applied to the RF amplifier 304 (step 510). If the BER is worse than a second predetermined acceptable level (step 512) the controller 318 increases the bias current (step 514) to attempt to bring the BER up to an acceptable level. In this way, the BER may be maintained within two acceptable limits. In an alternative embodiment, the controller may have only one threshold level, whereby the controller makes adjustments to the bias current to keep the BER as close to the threshold value as possible. A typically minimum acceptable BER threshold is around $2 \times 10^{-4}$, which results in a quasi-error free transport stream (having an error rate $<1 \times 10^{11}$). If the BER is better (i.e. less) than this value there will be no visible errors in a decoded picture. It is however preferable to set the acceptable threshold above the minimum required threshold, to allow for worst case scenarios.

By adjusting the bias current for the RF amplifier 306, it is possible to reduce the power consumption of the receiver, where conditions allow, without affecting the integrity of the decoded signal.

In receivers according to the prior art, maximum bias current is used at all times. Such receivers are therefore are not power efficient, especially when conditions dictate that bias current can be successfully reduced without affecting the integrity of the decoded signal.

In one embodiment of the present invention, the measurement of the BER is taken as an instantaneous value. In a further embodiment of the present invention, the BER value is averaged over a period of time. Taking instantaneous values of BER may, however, lead to excessive bias current adjustments being made, whereas averaging the BER values over too long a time period may not enable the system to react quick enough to changes in the received signal quality. In yet a further embodiment, the controller adjusts the bias current based on either an instantaneous value of BER or on an average value of BER, depending on the specific circumstances. For example, in a fixed set-top-box receiver, the channel conditions are unlikely to change quickly, therefore it may be preferable to average the BER values over a period ranging from a number of cycles up to around 10 seconds. In a mobile or portable receiver, where channel conditions may vary rapidly, using the instantaneous value of BER may be preferable.

In yet a further embodiment of the present invention, the controller adjusts the bias current based on the number of corrupt carriers which are detected, rather than on the BER value.

In yet another embodiment, for example, with terminals which are moved to a new location infrequently, such as for an exhibition or conference etc, it may be advantageous to perform the bias current adjustments less often, since the reception characteristics are less likely to change frequently.

It will be understood by those skilled in the art, that many variations on the above could be made without detracting from the inventive concepts of the present invention. For instance, the bias current could also be adjusted in accordance with any other variable which gives an indication of the quality of the received or the decoded signal. Furthermore, the bias current could be adjusted on any other component of which bias current affects linearity, such as mixers, further amplifiers etc. Indeed, the controller could be adapted to control the bias current of a plurality of devices of which bias current affects linearity.

Although the present invention is herein described with reference to digital transmissions, those skilled in the art will also appreciate that the present invention can be equally applied to analogue reception—providing that a measure of the quality of the received signal can be obtained, and the quality of the received signal can be influenced by a controllable non-linear element.

What is claimed is:

1. A receiver for receiving signals conveying information, wherein the receiver includes a non-linear element, the receiver comprising:
   a demodulator for demodulating the received signal to produce demodulated information;
   means for determining the quality of the demodulated information; and
   means for adjusting the linearity of the non-linear element in dependence on the determined quality, the adjusting comprising adjusting a bias current.

2. A receiver according to claim 1, wherein the non-linear element is a radio frequency (RF) amplifier for amplifying the received signals.

3. A receiver according to claims 1, wherein the means for determining the quality is a forward error correction (FEC) unit.

4. A receiver according to claim 3, wherein the FEC further provides a bit error rate (BER).

5. A receiver according to claim 2, wherein the means for adjusting the linearity comprises a controller capable of adjusting the bias current applied to the RF amplifier.

6. A receiver according to claim 5, wherein the controller adjusts the bias current applied to the RF amplifier based on an instantaneous value of BER.

7. A receiver according to claim 5, wherein the controller adjusts the bias current applied to the RF amplifier based on an average of a plurality of BER values.

8. A receiver according to claim 1, adapted for receiving multi-carrier signals.

9. A receiver according to claim 1, adapted for receiving orthogonal frequency division multiplex (OFDM) signals.

10. A portable terminal comprising a receiver as claimed in claim 1.

11. A method of receiving signals conveying information at a receiver comprising a non-linear element, the method comprising:
   demodulating the received signal to produce demodulated information;
   determining the quality of the demodulated information;
   adjusting the linearity of the non-linear element in dependence on the determined quality, the adjusting comprising adjusting a bias current.

12. A method according to claim 11, further comprising comparing the determined quality with a first predetermined value, and increasing the linearity of the non-linear element when the determined quality is less than the first predetermined value.

13. A method according to claim 12, further comprising comparing the determined quality with a second predetermined value, and decreasing the linearity of the non-linear element when the determined quality is greater than the second predetermined value.

14. A method of receiving signals conveying information at a receiver comprising a non-linear element, the method comprising:

demodulating the received signal to produce demodulated information;

determining the quality of the demodulated information; and comparing the determined quality with a first predetermined value, and increasing the linearity of the non-linear element when the determined quality is less than the first predetermined value and comparing the determined quality with a second predetermined value, and decreasing the linearity of the non-linear element when the determined quality is greater than the second predetermined value, the increasing and decreasing comprising adjusting a bias current.

* * * * *